United States Patent Office 3,564,944
Patented Feb. 23, 1971

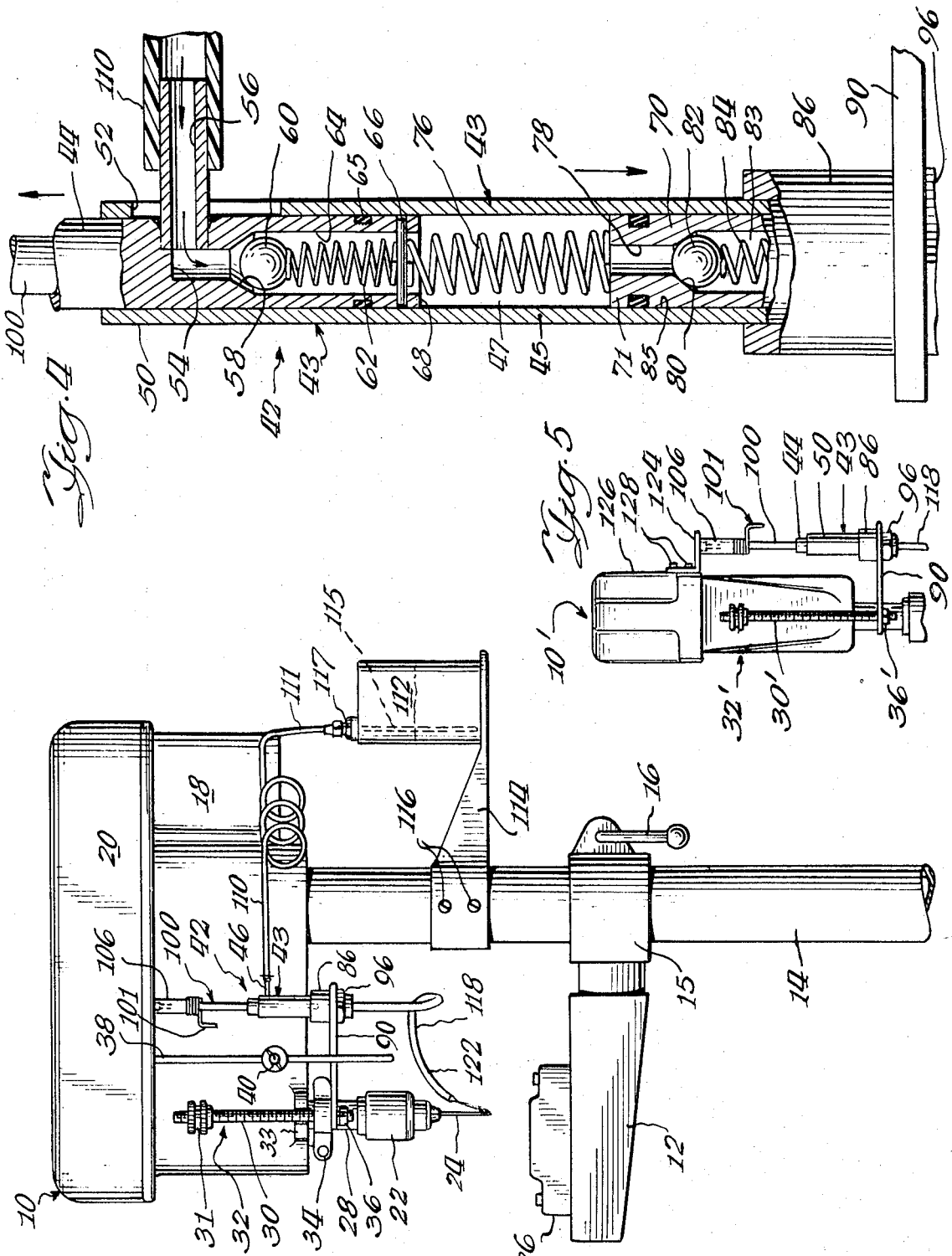

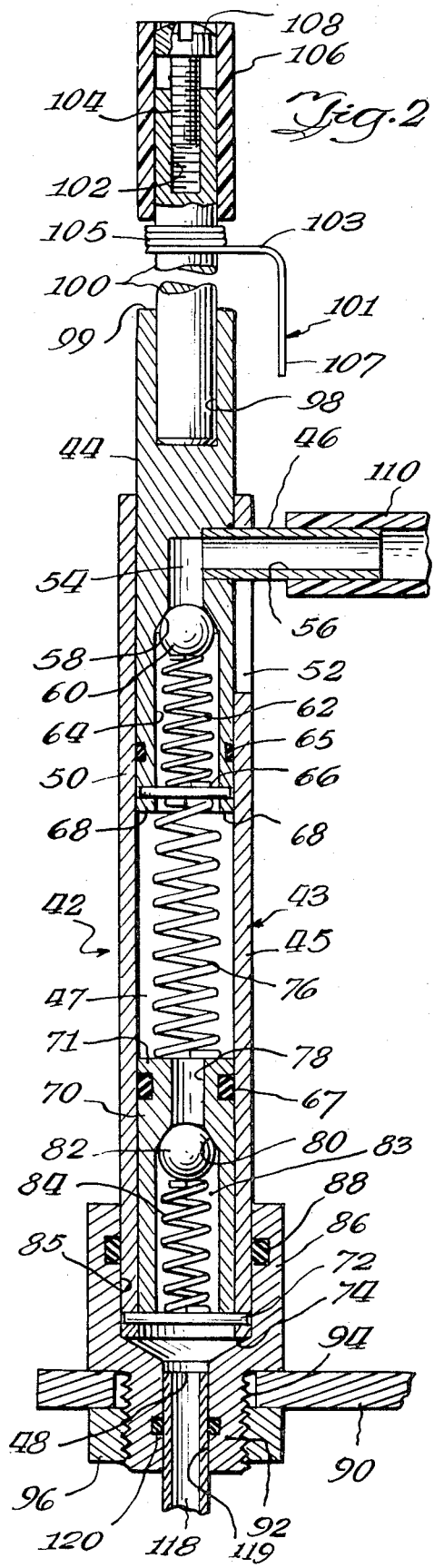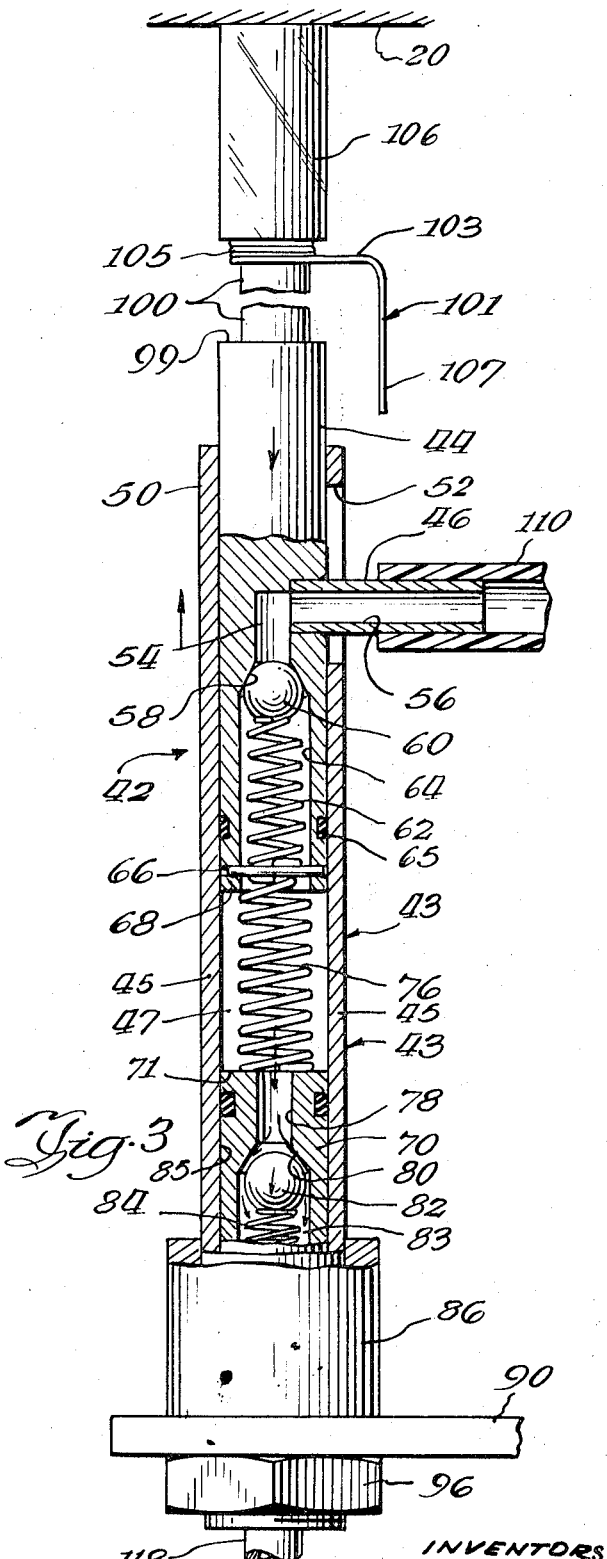

3,564,944
APPARATUS FOR AUTOMATICALLY APPLYING CUTTING FLUID TO A ROTATING TOOL
William G. Hill, Des Plaines, and James W. Trent III, Franklin Park, Ill., assignors to William G. Hill, Des Plaines, Ill.
Filed Feb. 3, 1969, Ser. No. 796,001
Int. Cl. B23b 47/00; F04b 11/00
U.S. Cl. 77—55          8 Claims

ABSTRACT OF THE DISCLOSURE

A pump is carried on the vertically reciprocal portion of a rotary machine and has its plunger connected to an extension protruding upward from the pump to engage a stop fixed to the machine. The bottom end of the pump has a discharge nozzle aimed at the cutting tool carried by the vertically reciprocal portion of the rotary machine. The pump chamber is connected by means of a flexible conduit to a remote reservoir. A pair of spaced check valves in the pump control the intake of cutting fluid from the reservoir and the discharge through the nozzle. The discharge stroke is executed at the end of the upward movement of the vertically reciprocal portion of the rotary machine when the extension engages the stop. Fluid is thus discharged to the cutting tool immediately before its use. Thereafter as the reciprocal portion of the rotary machine is moved downward, during the first portion of its stroke when the pressure of the extension upon the stop is relieved, the spring means in the pump moves the plunger in a direction to draw fluid into the pump chamber and retain the same there ready for the next discharge stroke. The pump cylinder with both valves is constructed as a unitary assembly providing many advantages.

FIELD OF THE INVENTION

The invention is concerned with the field of metal working generally and more specifically relates to the art of cooling and lubricating rotating cutting tools for metal and the like hard material. The invention resides in a simple pump for use with vertically reciprocating rotary machines, such as for example, drilling machines. These machines are required to feed rotating cutting tools into or against workpieces. There is normally a spindle carried in a body of some kind, called a quill in the case of a drill press. The cutting tool could be a drill bit, a tap, a router or some such device, and it is firmly chucked into the end of the spindle. The body which carries the spindle normally has a bracket of some kind which carries a simple depth gauge, and this gauge is adjusted and locked to provide a predetermined downward stroke into the workpiece. Thus, the quill of a drill press, which will be used as the example of rotary machine in this specification, has a collar or clamp secured thereto carrying the depth gauge.

Production machines, whether for small runs or mass production are normally provided with some means to dispense cutting fluid to the cutting tool, and in normal structures this is accomplished by means for flooding the cutting tool. Pumps and gravity flow supply an excess of fluid to the tool and this technique requires means for channelling the run-off, re-circulating pumps, filters, and other equipment which is familiar to those in this art. Where the rotary machine is not equipped for flooding the cutting tool, manual means are resorted to. The workman must apply cutting fluid frequently, without regard to quantity, directly to the tool by some manually operated dispenser.

The flooding technique is wasteful of cutting fluid, expensive and produces problems because of the excessive fluid being thrown and splashed around the work area, on the workpiece, on the machine and on the workman.

Other disadvantages attach to the use of excessive cutting fluid, including the requirement that the work platform be imperforate and properly drained. Many work tables have openings to enable securement of fixing devices, clamps and the like and where the work table is flooded with oils and fluids, perforations cannot be permitted.

Aside from the above disadvantages of the flooding techniques and the complex apparatus which must be used for their practice, it is not certain that flooding is required for efficiency of cutting. When it is considered that the fluid is normally being helically driven out of the workpiece during the cutting process, it would appear logical that a minimal amount be used, and that this be applied prior to the tool entering the workpiece.

The invention operates in the above described field, but overcomes the disadvantages enumerated on the basis that it carries out the theory mentioned—namely, a small quantity of cutting fluid is applied to the tool before it enters or engages the workpiece; none thereafter, until after the tool emerges. This is also done automatically, in synchronism with the movement of the vertically reciprocal portion of the rotary machine, due to the novel construction of the apparatus of the invention.

DESCRIPTION OF THE PRIOR ART

Flooding arrangements operated in conjunction with a vertically reciprocal rotary machine are disclosed in Pats. 1,196,572 and 2,429,741. Pat. 2,164,518 discloses a structure for lubricating the ways of a broaching machine which is installed as a permanent portion of the machine requiring special connections and apparatus. The pumping is accomplished manually or by movement of the ram driving the broaching tool, and while accomplished at the top of the ram stroke, there is no structure for feeding the oil to a tool after it has been withdrawn from the workpiece.

The invention herein differs from the prior art in the simplified self-contained pump structure on the basis of which it is readily attached to practically any vertically reciprocal machine, is readily disassembled without losing its charge of cutting fluid, is easily arranged for accurate adjustment of the amount of fluid dispensed and the directing of the stream of fluid against the tool, and may be rendered inoperative for dry cutting operations, if desired.

SUMMARY OF THE INVENTION

The invention to a large extent resides in a simplification of the apparatus over any of the prior art but additionally is directed to structure which applies the cutting fluid in accordance with the theory that has been explained above, rather than in accordance with the theory of flooding. There is a pump with two check valves, both of the valves being contained in a unitary structure that is held in assembly by means of an internal compression spring which forces one valve housing against a stop member in the bottom of the cylinder and forces the plunger or piston upward against stop means which is formed by cooperation between a feed nipple in the piston or plunger extending through a slot in the cylinder and being engaged by the upper end of the slot. The upper check valve is located in the plunger or piston.

The above described assembly is inserted into a coupling member which is secured for movement with the spindle of the rotary machine, being sealed by a simple O-ring. The plunger is also sealed by an O-ring and its upper end protrudes from the cylinder and has a socket into which an extension is removably engaged. The feed nipple is adapted to receive the end of a flexible conduit which leads to a remote reservoir. The dispensing nozzle is connected to the coupling member.

This described structure is highly simplified. The extension is cut to whatever size desired and arranged so that at the end of the upward stroke of the spindle and its quill (in the case of a drill press), it will engage some stop member, which may be a part of the belt guard or a simple bracket secured to a face of the housing of the drill mechanism. This extension is readily removed or installed in the socket to render the pump mechanism active or not as desired. Furthermore, the cylinder can be pulled out of the coupling member without disturbing the mounting of the coupling member and without losing any of the cutting fluid with which the pump chamber may be charged. Obviously, the structure of the invention is sold in disassembled condition, is readily installed in practically any kind of vertically reciprocal rotating machine and can be transferred to another machine or removed entirely from the machine without any difficulty. In the case of the installation of the apparatus on a drill press, as described in detail hereinafter, the coupling member which receives the lower end of the pump cylinder is mounted to a bracket that in turn is secured to the depth gauge of the drill press. It will be understood that the depth gauge bracket itself is secured to the quill and moves up and down with the quill and spindle. Obviously the coupling member can be secured to the vertically reciprocal housing of the spindle in any other way.

No limitations are intended due to the specific description of the invention as applied to a small drill press.

BRIEF DESCRIPTION OF THE DRAWINGS

FIG. 1 is a fragmentary side elevational view of the upper end of a small drill press having the apparatus of the invention mounted thereon for automatically applying cutting fluid to a rotating tool carried in the spindle of the drill press.

FIG. 2 is a fragmentary vertical median sectional view on an enlarged scale taken through the pump of the invention, the condition thereof being assumed to be one in which the pump chamber is filled with cutting fluid and the piston or plunger is in its uppermost position. This would be with the spindle and its carrying quill being displaced downward from the top of the stroke.

FIG. 3 is a view similar to that of FIG. 2 but in this case the plunger or piston has been pushed into the cylinder and the charge of cutting fluid in the pump chamber is being discharged. The spindle and quill in this case will have been moved either to the very top of their stroke or quite close to it.

FIG. 4 is a fragmentary sectional view similar to that of FIGS. 2 and 3 except that in this case the plunger or piston has been permitted to return to its uppermost position, as would be occasioned by the execution of a downward stroke of the spindle. The plunger in this view has not quite reached the top of its stroke, and cutting fluid is being drawn into the pump chamber by way of the feed nipple.

FIG. 5 is a fragmentary front elevational view of a slightly different drill press showing a modified manner of securing the apparatus of the invention thereto.

DESCRIPTION OF THE PREFERRED EMBODIMENT

The reference character 10 designates generally a conventional drill press having a work table 12 which is adjustably secured to a vertical column by means of a suitable clamp 15 whose screw member is shown at 16. The motor and other mechanism of the drill press 10 is normally enclosed by a housing 18 and the particular structure which is used as an example in the illustrations also has a so-called belt guard or other housing 20 which protects the user from exposed power transmitting means by which the rotation of the motor is used to drive the spindle.

The spindle of the drill press 10 includes a tool chuck 22 into which there is secured a suitable cutting tool. The particular tool illustrated is intended to be a drill bit 24, but as previously mentioned the invention is not limited to this use. A workpiece 26 is secured to the table 12 or may even be of a nature that the workman can hold it manually thereon. The spindle of the drill press rotates within a suitable non-rotating member that is capable of vertically reciprocal movement, this being the quill 28. Obviously only the chuck 22 of the rotating portion of the mechanism is visible in the views, but it will be appreciated that the chuck is carried on an elongated shaft which rotates, and that in any other type of rotating machine there is a form of rotating means that carries a tool holder. This is the generic means which is intended to be meant by reference to the spindle.

The drill press 10 is equipped with a simple depth gauge 32 that includes a clamp or collar 34 secured to the quill 28 and having a threaded rod 30 threadedly secured thereto and locked in place by a lower nut 36. There is a pair of thumb nuts 31 at the upper end of the rod 30 whose position readily may be adjusted to control the stroke of the spindle. The nuts 31 when locked together serve as a stop member to engage against the forked guide 33 formed on the housing 18 to limit the downward stroke of the spindle. The spindle is driven downward by a rack and pinion mechanism, not shown here, the pinion being connected to a shaft 40 that the workman rotates by means of a handle 38. The rack normally would be formed as a part of the quill 28, but other constructions are possible.

As thus far described, the press 10 is conventional, the details concerning the depth gauge being given because the apparatus of the invention is installed thereon. This is not to be considered limiting, however, since any form of vertically reciprocal rotary machine may be used, and the apparatus of the invention is capable of being mounted on any non-rotating portion of the machine which reciprocates vertically. For example, in the instant case, if there was no depth gauge, the apparatus of the invention could readily be installed by means of a suitable clamp or bracket attached to the quill 28.

The reference character 42 is used generally to designate the apparatus of the invention, the same comprising several parts. The apparatus is principally a pump, but this word will be used generally, and not necessarily to include all of the parts thereof. There is an assembly 43 that contains the pump valves; a coupling member 86 which carries the high pressure dispensing nozzle; an extension or actuator rod 100; and a cutting fluid source comprising a flexible conduit and remote reservoir, to be described. According to the invention, the assembly 43, coupling member 86 and the extension or actuator rod 100 are readily assembled or disassembled without the need for tools, and without disturbing the pumping system. The flexible conduit of the cutting fluid source is easily pulled off or pushed onto a suitable feed nipple 46 that serves several functions in the apparatus as will be described.

Basically, the apparatus is installed on a bracket 90 that is secured under the lock nut 36 so that it moves up and down with the chuck 22 and quill 28 as the machine is used. The coupling member 86 is the only part that is secured to the bracket 90. The assembly 43 is sealingly engaged into the coupling being inserted thereinto manually by the user. The extension or actuator rod 100 is cut to proper size in view of the stroke of the spindle, and manually inserted into the upper end of the piston 44 which is a part of the assembly 43. It is arranged to come into engagement with the belt guard 20 of the press 10 just before the upper end of the spindle stroke so as to give the plunger or piston 44 a short downward stroke. The upward movement of the spindle is normally accomplished by a stout return spring (not shown) that is a part of the conventional drill press mechanism. The belt guard 20 thus serves as a stop member in this case, but any suitable stop means may be used. In the commercial version of the apparatus, a simple angled member of metal is furnished as an alternate stop means, this being capable of securement to any fixed part of the press 10, such as for example to the housing 18. The extension 100 will be cut to a suitable size for this purpose.

This pump assembly 43 comprises a cylinder 45 having a hollow plug at its bottom end which forms the valve housing 70 and a piston 44 at its upper end, the lower portion of the piston 44 being hollow and forming the upper valve housing. The piston 44 and the lower plug 70 are urged in opposite directions to move out of the ends of the cylinder 45 by virtue of a strong helical spring 76 disposed in the pump chamber 47 and engaging against the lower end 68 of the piston 44 as well as against the upper end 71 of the plug or housing 70. The assembly 43 is made with a lower transverse pin 72 extending through suitable openings formed in the lower end 74 of the cylinder to block movement of the plug 70 out of the said end, and with the feeder nipple 46 engaging into the piston 44 through a slot 52 formed in the side wall of the cylinder 45 adjacent the upper end 50 of the cylinder 45.

Thus, the nipple 46 engaging against the upper end of the slot 52 limits the upward movement of the piston 44 and the condition shown in FIG. 2 shows the maximum extent to which the spring 76 is capable of forcing the piston 44. The slot 52 also provides the maximum stroke to which the piston 44 can be subjected, as for example, if pushed downward by the extension 100, the extensile action of the spring 76 is overcome and the piston 44 moves downward, as shown in FIG. 3, but only so far as permitted by the bottom of the slot 52. Usually the pump is adjusted so that its stroke never causes the nipple 46 to bottom in the slot 52.

The cutting fluid is admitted into the pump chamber 47 through the hollow bore 56 of the nipple 46, entering the upper valve chamber 54 above the ball valve 60. The ball 60 is seated in a suitable conical seat 58 and pressed against that seat by means of a helical spring 62 that is disposed in the cavity 64 and held in place by the transverse pin 66. This pin is mounted in suitable perforations formed in the lower end 68 of the piston 44. The fluid is adapted to pass downwardly through the pump chamber 47, into the hollow bore of the valve housing 70, past the ball valve 82, through the lower spring cavity 83, through the discharge opening 48 and into the pipe 118 and thence to the discharge nozzle 122. The valving action will be described hereinafter. The lower ball valve 82 seats on a conical seat 80 by the bias of a helical coiled spring 84 held in place by the pin 72.

The upper end of the piston 44 protrudes for a substantial distance out of the end of the bore of the cylinder 45, being sealed by suitable O-rings at 65. The axial end 99 has a coaxial socket 98 formed therein and the extension 100 is removably inserted in this socket. The extension of actuating rod 100 is cut by the user to any desired length, depending upon the manner of assembly of the apparatus 42 to the press 10, and as much of the extension as desired is trimmed from the portion which engages into the socket 98. The other end of the extension 100 has a coaxial threaded socket 102 within which there is an adjusting screw 108 to give fine adjustment of the desired stroke of the plunger or piston 44. The cylindrical sleeve 106 is of a relatively soft and resilient plastic material to provide resistance to the screw 108 changing its disposition in the threaded socket 102. Any suitable lock means could be used for this purpose. The wire clip 101 with its coiled engagement at 105, its angled bend 103 and its depending tongue 107 is for enabling the entire extension 100 to be removed from the socket 98 and hung at any convenient location while the apparatus 42 is inoperative, as for example when one wishes to operate dry.

With respect to the securement of the coupling member 86 to the bracket 90, the coupling member has a reduced diameter threaded nipple 92 which passes through a perforation 94 formed in the bracket 90 and is held in place by a clamping nut 96. Lock washers (not shown) may be used to secure the described connection. The pipe 118 is preferably formed of a suitable malleable metal such as brass or aluminum so that it can be bent to any desired disposition, and its end is easily inserted manually into the hollow reduced diameter bore 119 of the nipple 92 where it is sealed by suitable packing 120.

Referring now to FIG. 1, the conduit 110 is preferably of some type of resilient material such as plastic or the like which is chemically inert relative to the cutting fluid. Its remote end 111 is connected to the fitting 117 of the reservoir 112 which will carry a supply of cutting fluid, and has a dip tube 115 extending to the bottom of the reservoir. The reservoir can be located at any suitable place, even at a substantial distance from the press 10 because the apparatus 42 may readily be operated for a few strikes manually to prime the pump chamber 47. The pump can even be sold with a charge of fluid already included in the pump chamber, since it is impossible for the fluid to leak past the check valves of the assembly 43. In FIG. 1, the reservoir 112 is carried on an arm 114 secured at 116 to column 14.

In FIG. 5, the installation which does not utilize the belt guard is shown. Assuming a different type of press 10', again the bracket 90 is secured to the depth gauge 32' by the nut 36' at the bottom end of the threaded rod 30'. The angled member 124 is a simple metal bracket screwed into the housing 126 by means of fasteners 128. Operation of the apparatus is the same as that described in connection with the other illustrations.

In operation, assuming that everything has been adjusted properly, and the spindle and quill are somewhere at the bottom of their stroke, the condition of the pump apparatus is as shown in FIG. 2. The pump chamber 47 is full of cutting fluid (not shown). Now the workman permits the spindle and quill 28 to rise. When the screw 108 engages the belt guard 20 shortly before the completion of the upward movement of the spindle and quill, the piston 44 starts moving downward as indicated by the arrow in FIG. 3 shown on the piston, while the relative movement of the cylinder 45 is upward as indicated by the arrow alongside of the cylinder. The ball 60 is forced against its seat 58 and no cutting fluid can enter at 54. The nipple 46 slides downward in the slot 52 with the movement of the piston 44, this movement overcoming the resistance of the spring 76. The charge of liquid in the chamber 47 forces the ball 82 off its seat 80 against the resistance of the spring 84 and the liquid is driven at high pressure through the discharge port 48, into the pipe 118, out of the nozzle 122 and against the tool. In FIG. 3 the internal movement of this liquid is indicated by the small arrows.

When finally the upward stroke of the spindle and quill are completed and the apparatus comes to rest, the cutting tool 24 is lubricated and poised ready for use. At this point, the piston 44 has entered the cylinder as far as it can, considering the length of the extension 100 and the adjustment of the screw 108. As soon as the quantity of fluid is forced out of the chamber 47 which is sufficient to relieve the internal pressure thereof, the spring 84 raises the ball 82 against its seat and no further fluid emerges from the pumping chamber.

If nothing further is done, this condition will obtain indefinitely, and eventually, the liquid on the tool 24 may drip off or dry. As a rule, however, the apparatus will be used for machines which are cycled frequently in continuous runs. In such cases, the workman will immediately operate the handle 38 to lower the cutting tool to the workpiece 26. As soon as the pressure against the belt guard 20 is relieved, the spring 76 enlongates and presses the pitson 44 upward, as shown by the upper external arrow in FIG. 4. At the same time the relative cylinder movement is downward as indicated by the lower external arrow. This increases the volume of the chamber 47, sucks the ball 82 even tighter against its seat 80, and produces a lower pressure in the chamber 47. This lowering of pressure unseats the ball 60 against the spring pressure of the spring 62, and the lowered pressure is effective to suck liquid by way of the bore 56 and the upper valve chamber into the pumping chamber 47 as indicated by the internal arrows. After the extension 100 leaves the belt guard 20, the spring having pushed the pitson 44 its full extent with the nipple 46 engaging against the upper end of the slot 52, the chamber 47 is charged with fluid and the ball 60 reseats, closing off the chamber 47 with a charge of liquid therein ready for the next dispensing action.

It will be noted that leakage past the valve 82 at the outside of the plug or housing 70 is prevented by O-ring 67 and that leakage out of the coupling member 86 is prevented by the O-ring 88. In this latter connection, the lower end of the cylinder 45 engages in a socket 85 formed in the coupling member 86 and the O-ring 88 is provided in a suitable annular groove on the inner wall of the socket. Thus, it is a simple matter to pull the assembly 42 out of the socket 85 or push it into the socket without losing the seal. This can be done any time that the piston is not being moved, even with the chamber 47 full of fluid. Accordingly it is readily feasible to transfer the entire apparatus to another machine or to disassemble it into its several components without worrying about spillage of fluid.

It will be appreciated that only a small quantity of cutting fluid is used for each cycle of up and down movement of the spindle. It has been found that for practically all cases the amount of fluid dispensed on a one-shot basis can be adjusted to be sufficient for the cutting operation.

Variations are capable of being made without departing from the spirit or scope of the invention as defined by the appended claims.

What it is desired to be secured by Letters Patent of the United States is:

1. A pump for dispensing a metered quantity of cutting fluid onto a cutting tool of a vertically reciprocal rotating metal working machine comprising:
 (A) a cylinder assembly comprising:
   (i) a cylinder open at both ends and having a closed end slot adjacent the upper end thereof,
   (ii) a piston reciprocal in the upper open end of the cylinder and having a first check valve in the lower end thereof, a blind upper end passageway above the check valve and an inlet conduit engaged with said blind end passageway and extending through said slot whereby to limit relative movement between the piston and cylinder, said piston having a portion outside of the cylinder and having cou- pling means for securing an extension thereto,
   (iii) a hollow plug sealingly telescoped in the lower end of the cylinder and the cylinder having stop means to prevent movement of said plug out of the lower open end thereof, and said plug having a second check valve therein,
   (iv) and an extensile coiled spring in the center of the cylinder biasing the piston and plug to move outward,
 (B) a coupling member mounted to a bracket, the bracket adapted for securement to a non-rotative vertically reciprocal part of a metal working machine, the coupling member being hollow and having a socket in its upper end and a discharge conduit and fluid dispensing nozzle connected to its lower end so that fluid injected into said socket will pass through said discharge conduit to said nozzle,
 (C) and an actuating extension coupled to said piston by said coupling means and adapted to engage a fixed part of said metal working machine during the reciprocation of said reciprocal part,
said cylinder assembly being sealingly but removably engaged in said socket, and said inlet conduit adapted to have a cutting fluid source connected therewith.

2. The pump as claimed in claim 1 in which said actuating extension is adjustable in length to control the stroke of the piston.

3. The pump as claimed in claim 1 in which the coupling means provides for ready manual disassembly of the extension and the piston.

4. The pump as claimed in claim 1 in which the discharge conduit is sealingly and removably engaged within the lower end of the coupling member.

5. For use with a metal working and the like machine adapted to have a cutting tool connected with a rotating and vertically reciprocating part thereof, and said machine being of the type having a fixed part and a vertically reciprocal part that is non-rotative but moves with the rotating part; an automatic cutting fluid dispenser comprising:
 (A) a pump having:
   (i) a cylinder arranged vertically,
   (ii) a piston reciprocal in said cylinder and having an extension protruding upward externally of said cylinder,
   (iii) a pair of check valves at opposite ends of the cylinder for controlling the flow of liquid into the cylinder and expression thereof from the cylinder with reciprocation of the piston,
   (iv) an internal spring in the cylinder engaging the piston at the inner axial end thereof for biasing the same to move outward of the cylinder,
   (v) first stop means to prevent emergence of the piston from the cylinder in its outward movement,
   (vi) second stop means at the lower end of the cylinder to seat said internal spring,
 (B) a bracket connected with said pump and adapted for securing said pump to said non-rotative vertically reciprocal part, so that the pump moves vertically therewith,
 (C) said extension having means adapted for engagement with said fixed part at the top of the vertical movement of said pump whereby to cause a first relative movement between the piston and cylinder at the upper end of said vertical movement, with a reverse relative movement effected by said internal spring when the pump commences moving vertically downward,
   (i) the first relative movement producing an expression of liquid from the interior of the cylinder past the lower check valve, and the cylinder having a fluid directing pipe and nozzle connected therewith for leading a stream of fluid to said cutting tool,
   (ii) the reverse relative movement closing the lower check valve and opening the upper check valve and drawing fluid into said cylinder,
 (D) said pump having a connection between said cylinder through the wall thereof above the upper check valve and a conduit leading to a reservoir of cutting fluid whereby, the reciprocation of said pump with said vertically reciprocal part is adapted to apply a quantity of cutting fluid to the cutting tool while completing the upward movement of the reciprocating stroke, and to draw fluid into the pump while starting the downward movement of the reciprocating stroke.

6. The dispenser as claimed in claim 5 in which there is a hollow plug sealingly telescoped in the lower end of the cylinder, said check valves being positioned in said piston and plug respectively.

7. The dispenser as claimed in claim 5 in which a coupling member is mounted to said bracket, the coupling member being hollow and having a socket in its upper end in which the pump is engaged and a discharge conduit and fluid dispensing nozzle connected to the lower end of the coupling member to direct the flow of said fluid.

8. The dispenser as claimed in claim 5 in which said means to cause a first relative movement between the piston and cylinder is adjustable in length to control the stroke of the piston.

References Cited

UNITED STATES PATENTS

| | | | |
|---|---|---|---|
| 2,253,122 | 8/1941 | Hamant | 103—188 |
| 2,360,648 | 10/1944 | Copeland et al. | 103—189 |
| 2,381,650 | 8/1945 | Dick | 77—55 |
| 2,537,336 | 1/1951 | Ericson | 103—189 |
| 3,293,953 | 12/1966 | Hendrick | 77—55 |

FOREIGN PATENTS

| | | | |
|---|---|---|---|
| 1,024,627 | 1/1953 | France | 103—188 |
| 1,140,995 | 3/1957 | France | 103—178 |

WILLIAM L. FREEH, Primary Examiner

U.S. Cl. X.R.

417—544